United States Patent
Pifer et al.

(10) Patent No.: US 9,500,291 B2
(45) Date of Patent: Nov. 22, 2016

(54) ISOLATION VALVE WITH FAST DEPRESSURIZATION FOR HIGH-PRESSURE FUEL TANK

(71) Applicant: Eaton Corporation, Cleveland, OH (US)

(72) Inventors: Daniel Lee Pifer, Chelsea, MI (US); Raymond Bruce McLauchlan, Macomb Township, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/611,637

(22) Filed: Feb. 2, 2015

(65) Prior Publication Data

US 2015/0144819 A1 May 28, 2015

Related U.S. Application Data

(63) Continuation-in-part of application No. 13/011,511, filed on Jan. 21, 2011, now Pat. No. 8,944,100, which is a continuation-in-part of application No. 12/749,924, filed on Mar. 30, 2010, now Pat. No. 8,584,704.

(51) Int. Cl.
*F16K 31/06* (2006.01)
*F02D 41/00* (2006.01)
(Continued)

(52) U.S. Cl.
CPC ..... *F16K 31/0655* (2013.01); *B60K 15/03519* (2013.01); *F02D 41/004* (2013.01);
(Continued)

(58) Field of Classification Search
CPC .............. F16K 31/0655; F16K 24/04; F16K 31/0658; F16K 31/0696; F16K 1/44; F02M 25/0836; F02M 2025/0845; B60K 15/03519; F02D 41/004; Y10T 137/87388; Y10T 137/87394; Y10T 137/8704; Y10T 137/87016

USPC ............ 137/599.11, 599.18, 630.19, 630.22
See application file for complete search history.

(56) References Cited

U.S. PATENT DOCUMENTS

| 4,370,983 | A | 2/1983 | Lichtenstein |
| 5,048,790 | A | 9/1991 | Wells |

(Continued)

FOREIGN PATENT DOCUMENTS

| EP | 0713036 A1 | 5/1996 |
| EP | 2071217 A1 | 6/2009 |
| WO | 0190611 A2 | 11/2001 |

OTHER PUBLICATIONS

Yojiro Iriyama, Masahide Kobayashi, Takuji Matsubara, Yuusaku Nishimura, Ryosuke Nomura, and Takashi Ishikawa, "Design of a Fuel Vapor-containment System (FVS) to Meet Zero Evaporative Emissions Requirements in a Hybrid Electric Vehicle," SAE International, 2005-01-3825.

*Primary Examiner* — Atif Chaudry
(74) *Attorney, Agent, or Firm* — Dykema Gossett PLLC

(57) ABSTRACT

An isolation valve may include a flow restrictor disposed in a passage having non-parallel sides, the flow restrictor having an orifice. A flow restrictor spring may apply a biasing force on the flow restrictor to bias the flow restrictor to an open position. A solenoid assembly may include having a coil and an armature that may be moveable between (i) an extended position that overcomes the biasing force of the restrictor spring to move the flow restrictor to a closed position and to close the second orifice, and (ii) a retracted position to open the orifice. If the coil is energized, the armature may move to the retracted position to allow vapor to flow through the orifice at least until the biasing force of the flow restrictor spring overcomes a vapor pressure. The open position of the flow restrictor may allow vapor to flow through a space between the flow restrictor and the passage.

23 Claims, 8 Drawing Sheets

(51) Int. Cl.
  *F16K 1/44*       (2006.01)
  *F16K 24/04*      (2006.01)
  *B60K 15/035*     (2006.01)
  *F02M 25/08*      (2006.01)
  *F16K 17/04*      (2006.01)
  *B60K 15/03*      (2006.01)

(52) U.S. Cl.
  CPC ............ *F02M25/0836* (2013.01); *F16K 1/44* (2013.01); *F16K 17/0413* (2013.01); *F16K 24/04* (2013.01); *F16K 31/0658* (2013.01); *F16K 31/0696* (2013.01); *B60K 2015/03302* (2013.01); *F02M 2025/0845* (2013.01); *Y10T 137/7761* (2015.04); *Y10T 137/8704* (2015.04); *Y10T 137/87016* (2015.04); *Y10T 137/87338* (2015.04); *Y10T 137/87394* (2015.04)

(56) References Cited

U.S. PATENT DOCUMENTS

| | | |
|---|---|---|
| 5,211,151 A | 5/1993 | Nakajima et al. |
| 5,406,975 A | 4/1995 | Nakamichi et al. |
| 5,605,177 A | 2/1997 | Ohashi et al. |
| 5,657,962 A * | 8/1997 | Neron ............... F02M 25/0836 123/520 |
| 5,967,183 A | 10/1999 | Detweiler et al. |
| 6,526,951 B2 | 3/2003 | Ishigaki et al. |
| 7,152,587 B2 | 12/2006 | Suzuki |
| 7,267,113 B2 | 9/2007 | Tsuge et al. |
| 7,270,310 B2 | 9/2007 | Takakura |
| 7,448,367 B1 | 11/2008 | Reddy et al. |
| 2001/0017160 A1 | 8/2001 | Ishigaki et al. |
| 2005/0181647 A1 | 8/2005 | Dehnen et al. |
| 2005/0217734 A1 | 10/2005 | Takakura |
| 2006/0185735 A1 * | 8/2006 | Tsuge ............... F02M 25/0836 137/495 |
| 2006/0207663 A1 | 9/2006 | Tsuge |
| 2008/0042086 A1 | 2/2008 | Sisk et al. |
| 2010/0269921 A1 | 10/2010 | Pifer et al. |

* cited by examiner

ISOLATION VALVE WITH FAST DEPRESSURIZATION FOR HIGH-PRESSURE FUEL TANK

REFERENCE TO RELATED APPLICATIONS

This application is a continuation-in-part of U.S. patent application Ser. No. 13/011,511 filed on Jan. 21, 2011, which is a continuation-in-part of U.S. patent application Ser. No. 12/749,924 filed on Mar. 30, 2010.

TECHNICAL FIELD

The present teachings relates to a valve assembly for controlling fluid flow to and from a high-pressure fuel tank, and more particularly to such a valve assembly that can be depressurized quickly.

BACKGROUND

High-pressure fuel tanks may use an isolation valve to open and close a vapor path between the fuel tank and a purge canister. In a typical evaporative emissions system, vented vapors from the fuel system are sent to a purge canister containing activated charcoal, which adsorbs fuel vapors. During certain engine operational modes, with the help of specifically designed control valves (e.g., vapor vent valves), the fuel vapors are adsorbed within the canister. Subsequently, during other engine operational modes, and with the help of additional control valves, fresh air is drawn through the canister, pulling the fuel vapor into the engine where it is burned.

For high-pressure fuel tank systems, an isolation valve may be used to isolate fuel tank emissions and prevent them from overloading the canister and vapor lines. The isolation valve itself may be a normally closed valve that is opened to allow vapor flow for tank depressurization or any other event where vapor release is desired. The vapor flow rate may be controlled to, for example, prevent corking of vent valves elsewhere in the emissions system.

There is a desire for an isolation valve that can be used in high-pressure fuel tanks and that can depressurize quickly in a controlled manner to allow user access to the fuel tank within a reasonable amount of time.

BRIEF SUMMARY

An isolation valve according to one example of the present teachings may include a flow restrictor disposed in a passage having non-parallel sides, the flow restrictor having an orifice. A flow restrictor spring may apply a biasing force on the flow restrictor to bias the flow restrictor to an open position. A solenoid assembly may include having a coil and an armature that may be moveable between (i) an extended position that overcomes the biasing force of the restrictor spring to move the flow restrictor to a closed position and to close the second orifice, and (ii) a retracted position to open the orifice. If the coil is energized, the armature may move to the refracted position to allow vapor to flow through the orifice at least until the biasing force of the flow restrictor spring overcomes a vapor pressure. The open position of the flow restrictor may allow vapor to flow through a space between the flow restrictor and the passage.

An isolation valve according to another example of the present teachings may include a body including a passage having non-parallel sides and a flow restrictor disposed in the passage. The flow restrictor may include an orifice, an open position in which the flow restrictor allows vapor flow in a space between the flow restrictor and the passage, and/or a closed position in which the flow restrictor prevents vapor flow between the flow restrictor and the passage. The isolation valve may include an armature that may be movable between (i) an extended position in which the armature prevents vapor flow through the orifice, and (ii) a retracted position, in which the armature allows vapor flow through the orifice.

A method of operating an isolation valve according to another example of the present teaching may include providing an isolation valve body including a passage having non-parallel sides; providing an flow restrictor in the passage. The flow restrictor may include an orifice and a piston that may be movable between (i) an open position in which the flow restrictor allows vapor flow in a space between the flow restrictor and the passage, and (ii) a closed position in which the flow restrictor prevents vapor flow between the flow restrictor and the passage. The method may include providing an armature that may be movable between (i) an extended position in which the armature prevents vapor flow through the orifice, and (ii) a retracted position, in which the armature allows vapor flow through the orifice. The method may include moving the armature to the retracted position to allow vapor to flow through the orifice, reducing a vapor pressure via vapor flowing through the orifice, and/or moving the piston gradually from the closed position toward the open position.

DETAILED DESCRIPTION

Figure 1:
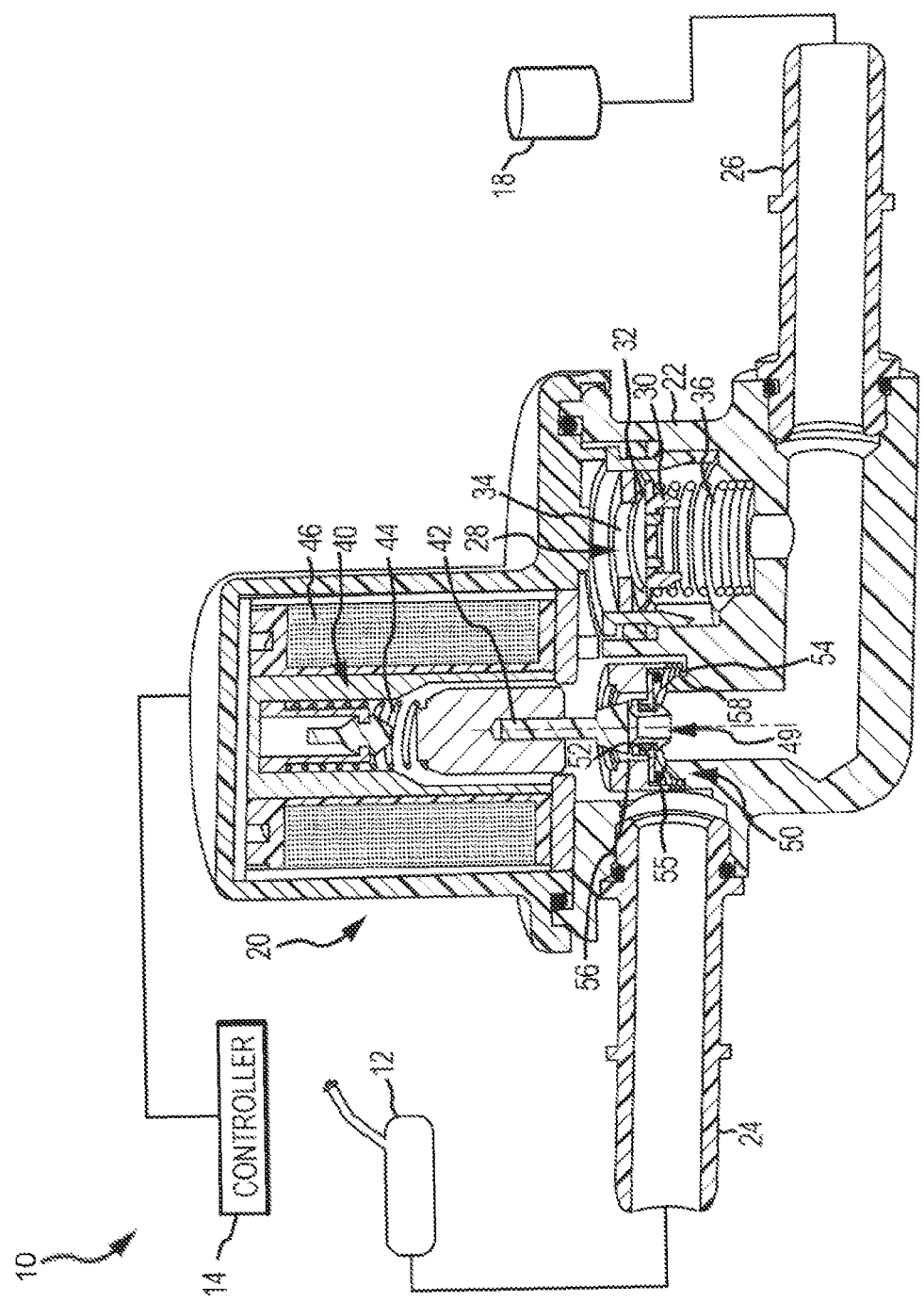
FIG. 1 is a cross-sectional view of a valve assembly configured for controlling fuel vapor flow between a fuel tank and a purge canister, with the valve shown in a completely closed state, according to one example of the present teachings.
Figure 1A:
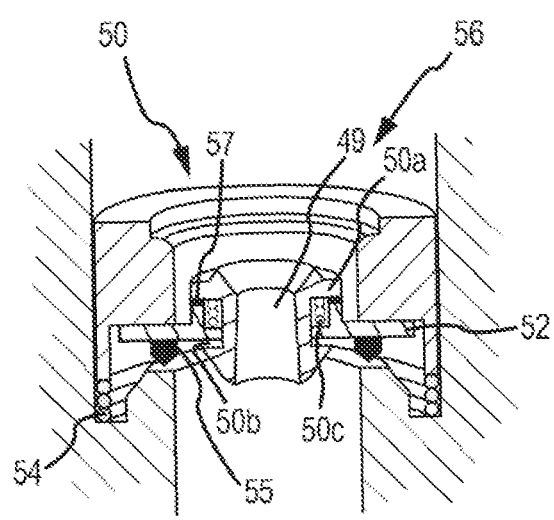
FIG. 1A is a magnified cross-sectional view of a depressurizing valve according one example of the present teachings.

Referring to the drawings, FIG. 1 generally illustrates a fuel system, schematically represented by numeral 10. The system 10 may include a fuel tank 12 and a controller 14 that may regulate the operation of an engine (not shown) and its fuel delivery system (not shown). Fuel tank 12 may be operatively connected to an evaporative emissions control system that includes a purge canister 18 that may collect fuel vapor from the fuel tank 12 and subsequently release the fuel vapor to the engine. In addition, controller 14 may regulate the operation of a valve assembly 20 to selectively open and close the valve assembly 20, which may provide overpressure relief and/or vacuum relief for the fuel tank 12. Valve assembly 20 may be connected to tank 12 via tank connector 24 and/or to canister 18 via canister connector 26.

The valve assembly 20 itself may control fuel vapor flow between the fuel tank 12 and the purge canister 18. Although the valve assembly 20 shown in the figures is located between the fuel tank 12 and the purge canister 18, nothing precludes the valve assembly 20 from being located elsewhere, such as between the purge canister 18 and the engine.

The valve assembly 20 may include a housing 22 that retains internal components of the valve assembly 20 in a compact manner. The valve assembly 20 may include a relief valve 28. The relief valve 28 may include a piston 30, which may be formed from a suitable chemically-resistant material such as an appropriate plastic or aluminum. The relief valve 28 may also include a compliant seal 32, which may be formed from a suitable chemically-resistant elastomeric material. During operation, the seal 32 may make initial contact with the housing 22 along the seal's outer edge. After the initial contact with housing 22, the outer edge of seal 32 may deflect to conform to the housing and seal a passage 34.

The piston 30 and the seal 32 may be combined into a unitary piston assembly via an appropriate manufacturing process, such as overmolding, as understood by those skilled in the art. The piston 30 and the seal 32 may be biased to close the passage 34. A spring 36 or other resilient member may bias the piston and the seal 32. The relief valve 28 may generally be used to open a vapor path between the fuel tank 12 and the purge canister 18 to relieve an extreme or over-pressure condition in the fuel tank 12. Additional details of the operation of the relief valve 28 in conjunction with the rest of the valve assembly 20 are described in commonly-assigned, U.S. Pat. No. 8,584,704 on Mar. 30, 2010, the disclosure of which is incorporated by reference herein in its entirety.

The description below will now focus on operation of the valve assembly 20, and particularly a solenoid assembly 40 and components that operate in conjunction with it, during a depressurization operation prior to refueling.

Figure 2:
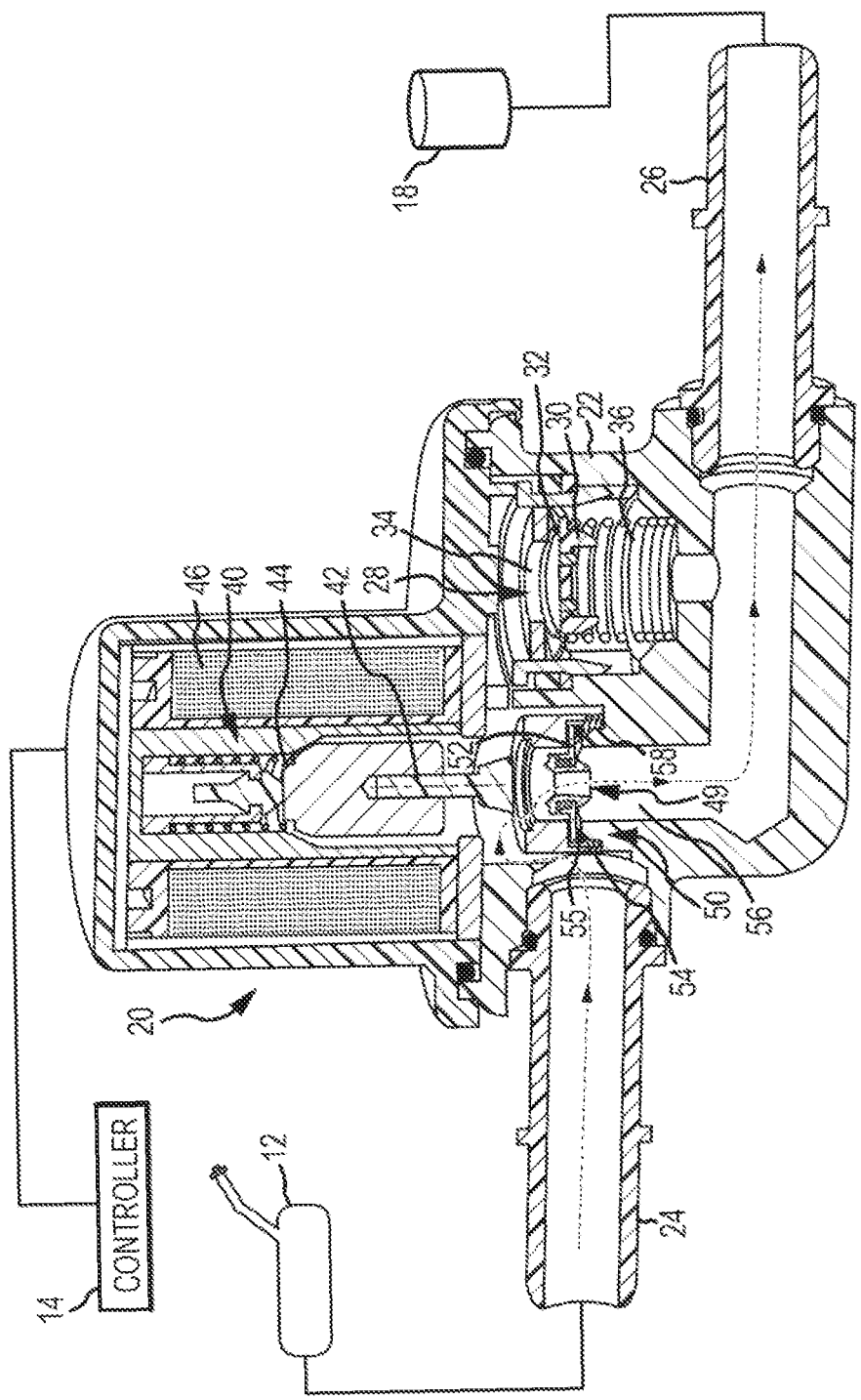
FIG. 2 is a cross-sectional view of the valve assembly shown in FIG. 1 when a solenoid in the valve assembly is energized during a start of a depressurization process conducted before refueling of the fuel tank.

The solenoid assembly 40 includes an armature 42, a solenoid spring 44, and a coil 46. The energization and de-energization of the coil 46 may be controlled by a signal from the controller 14. The solenoid spring 44 may generate a force sufficient to urge the armature 42 out of the solenoid assembly 40 when the coil 46 is not energized. When the coil 46 is energized, the resulting magnetic forces overcome the biasing force of the solenoid spring 44 and pull the armature 42 into the solenoid assembly 40, exposing a small orifice 49 in a flow restrictor 50 to allow vapor flow through the orifice 49 (see, e.g., FIG. 2).

In one example of the present teachings, the flow restrictor 50 may be arranged inside the housing 22 and may include a piston portion 52, which may be formed from a suitable chemically-resistant material such as an appropriate plastic or aluminum. The flow restrictor 50 may also include a compliant seal 55, which may be formed from a suitable chemically-resistant rubber. During valve operation, the seal 55 may initially contact the housing 22 along the seal's outer edge. After initial contact with the housing 22, the outer edge of seal 55 may deflect to conform to the housing 22 and hermetically close a passage 56 leading to the canister connector 26.

In one aspect of the present teachings, the size of the small orifice 49 in the flow restrictor 50 is selected to allow only a selected amount of flow at a maximum specified tank pressure because the size of the passage 56 is may be large enough to prevent "corking." More particularly, without the small orifice 49 slowing vapor flow through the passage 56, the force from rushing fuel vapors may force other valves in the system 10, such as a fuel limit vent valve (not shown) in the fuel tank 12, to "cork" into a closed position. Thus, the reduced size of the small orifice 49 in the flow restrictor 50 may control the vapor flow to a level that prevents corking. Vapor control may be desired for other purposes as well without Referring again to FIG. 2, when a user wishes to refuel the tank, the user may wish to depressurize the fuel tank first so that the potentially high pressure in the tank 12 is lowered to a specified acceptable level. However, the size of the small orifice 49 may restrict the vapor flow rate to a level that is not high enough to depressurize the tank in a reasonable amount of time. On the other hand, allowing unrestricted vapor flow through the isolation valve 10 may cause other valves in the system to cork, such as explained above.

To provide closer control over vapor flow, the flow restrictor 50 may include a depressurization valve 50*a*, as shown in FIG. IA, to allow faster tank depressurization. The depressurization valve 50*a* may be a poppet valve, wherein the small orifice 49 is in the poppet valve rather than the piston 52. The depressurization valve 50*a* may have its own associated seal 57 that seats against the piston 52. In examples of the present teachings, the depressurization valve 50*a* may disposed in an intermediate orifice 50*b* in the piston 52. In one aspect of the present teachings, the size of the intermediate orifice 50*b* may be selected to allow increased vapor flow while still limiting the flow enough to prevent corking of fuel venting valves. The depressurization valve 50*a* may be biased toward an open position by a depressurization spring 50*c* supported by the piston 52. In one aspect of the present teachings, the spring 50*c* may have a biasing force that is greater than the spring 54 biasing the flow restrictor 50 itself.

The flow restrictor 50 may have two effective orifice sizes that may be opened when the solenoid assembly 40 is energized: (1) a small orifice 49 in the depressurization valve 50*a* that may ensure vapor flow rate between the tank and the canister is less than a maximum flow rate to prevent corking of fuel tank venting valves during normal valve operation; and, (2) an intermediate orifice 50*b* in the piston 52 that, in combination with the small orifice 49, may allow faster tank depressurization, such as before a refueling operation. Also, a difference in biasing forces between the springs 54, 50*c* may allow the depressurization valve 50*a* to open at a given vapor pressure while the flow restrictor 50 remains in a closed position, which may allow vapor to flow simultaneously through the small orifice 49 and the intermediate orifice 50*b*.

In examples of the present teachings, a user may depressurize the tank 12 by, for example, pushing a button on the interior of the vehicle to send a control signal from the controller 14. The signal may energize the coil 46, which may create a magnetic force that withdraws the armature 42 to open the small orifice 49 and creates a flow path through the flow restrictor 50 and the passage 56. High tank pressure may create a high vapor flow rate, which provide enough initial force to compress both springs 54, 50*c*, keeping the piston 52 and the depressurization valve 50a pushed downward against the large passage 56 and restricting flow to only through the small orifice 49.

Figure 3:
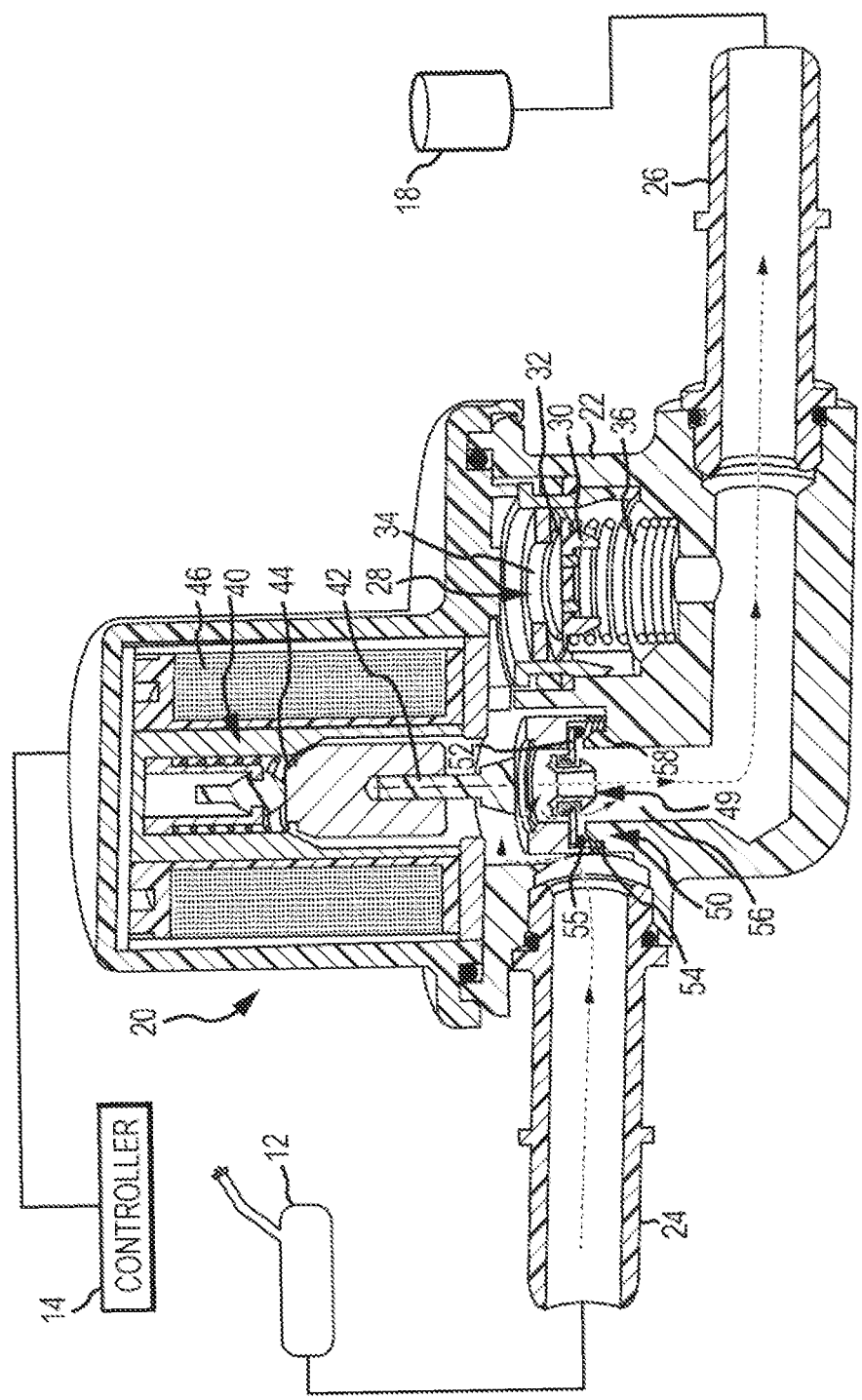
FIG. 3 is a cross-sectional view of the valve assembly shown in FIG. 1 when the solenoid is energized and the depressurizing valve is in an open position while the flow restrictor is in a closed position.

Referring to FIG. 3, if the spring force of the depressurization spring 50c biasing the depressurization valve 50a to an open position is larger than the spring force of the restrictor spring 54 biasing the flow restrictor 50 to an open position, and since the vapor pressure may drop soon after a small amount of vapor escapes through the small orifice 49, the depressurization spring 50c may force the depressurization valve 50a to an open position. The open position of the depressurization valve 50A may allow for increased vapor flow by creating two flow paths out of the tank 12, which may include one through the small orifice 49 and one through the intermediate orifice 50b (e.g., in the space between the depressurization valve 50a and the piston 52). The intermediate orifice 50b, which may be larger than small orifice 49, may allow an increased flow rate out of the tank, which may allow the tank 12 to depressurize to a desired level quicker than through the small orifice 49 alone.

Figure 4:
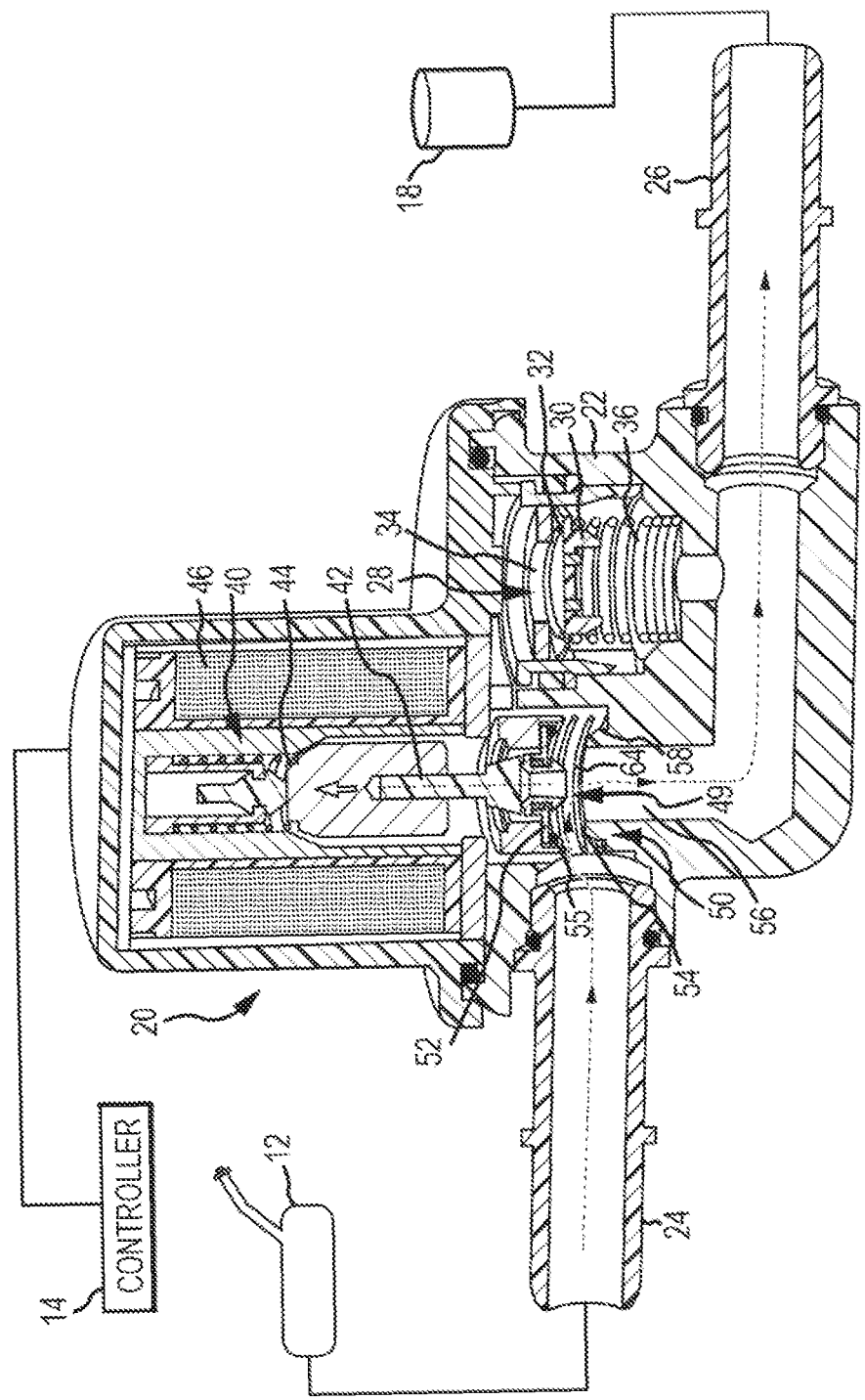
FIG. 4 is a cross-sectional view of the valve assembly shown in FIG. 1 where both the depressurizing valve and the flow restrictor are both in an open position.

Referring to FIG. 4, the vapor pressure may drop low enough so that the restrictor spring 54 overcomes the vapor pressure from the tank and pushes the flow restrictor 50 open as well, which may open a flow path through the large passage 56. As shown in FIG. 4, the large passage 56 may be exposed when the armature 42 is withdrawn into the solenoid assembly 40 in response to a tank depressurization signal, such as noted above. This combination of lower tank pressure and withdrawn armature 42 may allow the restrictor spring 54 to extend, which may push the flow restrictor 50 upward against the armature 42 to close the small orifice 49 and intermediate orifice 50b and open the large passage 56. At this point, the tank pressure may be low enough to keep the vapor flow at a lower level during the final stages of the tank depressurization process, which may prevent corking in the fuel vent valves.

The varying opening sizes 49, 50b, 56, used both alone and in combination, and the different biasing forces of the springs 44, 50c may provide fast, yet controlled, tank depressurization while still keeping the vapor flow rate low enough to prevent corking of fuel vent valves in the emissions system.

Figure 5:
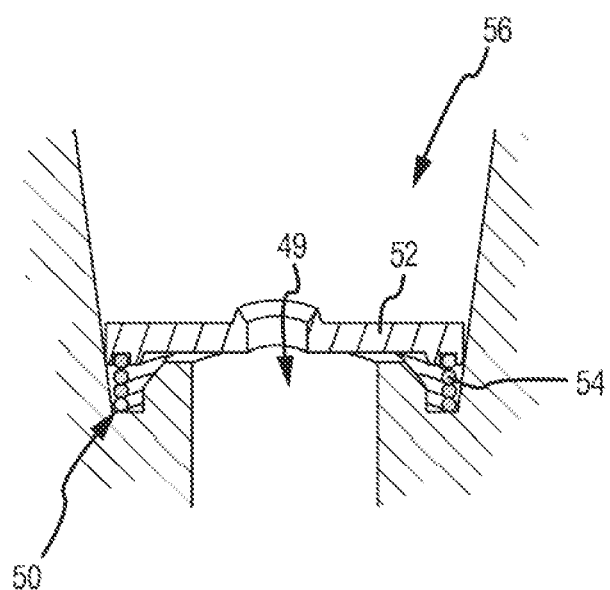
FIG. 5 is a cross-sectional view of a valve assembly according to another example of the present teachings.

FIG. 5 shows a further example of the present teachings that may increase the vapor flow rate through the valve assembly 20. This particular example may omit a separate depressurization valve and additional orifice sizes. Instead, this example may provide for modification of the configuration of the passage 56, the characteristics of the restrictor spring 54, and/or the weight of components of flow restrictor 50 (e.g., piston 52) to permit vapor flow to increase gradually through the passage 56.

For instance, the passage 56 may include sides that may not be parallel. Passage 56 may comprise generally cylindrically shaped sides that may include arcuate sections. In an example of the present teachings, passage 56 may be funnel-shaped, which may include some or all arcuate sections of passage 56 being tapered. When the coil 46 is initially energized to initiate tank depressurization, the armature 42 may withdraw into the solenoid assembly 40, allowing vapor to initially flow through the small orifice 49. As the vapor pressure drops, the biasing force of the restrictor spring 54 may lift the piston 52 from the passage 56 to allow some of the vapor to bypass the flow restrictor 50 directly into the passage 56. However, the funnel shape of the passage 56 restricts the amount of vapor flowing through the passage 56, thereby preventing corking of the fuel vent valves. As a difference in pressure is reduced, the restrictor spring 54 may gradually force the flow restrictor 50 up the funnel-shaped passage 56 to a wider point, which may allow even more vapor to flow under and/or around the flow restrictor 50 into the passage.

In previous examples of the present teachings, flow restrictor 50 may generally operate in a binary fashion, such that flow restrictor 50 is either opened or closed at a predetermined pressure. In this example of the present teachings, a funnel-shaped passage 56 may permit gradual opening and/or gradual closing of flow restrictor 50, which may allow for reduced depressurization time without causing other vent valves to cork. Additionally or alternatively, a funnel-shaped passage 56 may allow for orifice 49 to be smaller and a smaller orifice 49 may be opened via a lower amount of force, which may allow for using a smaller solenoid assembly 40.

Figure 5A:
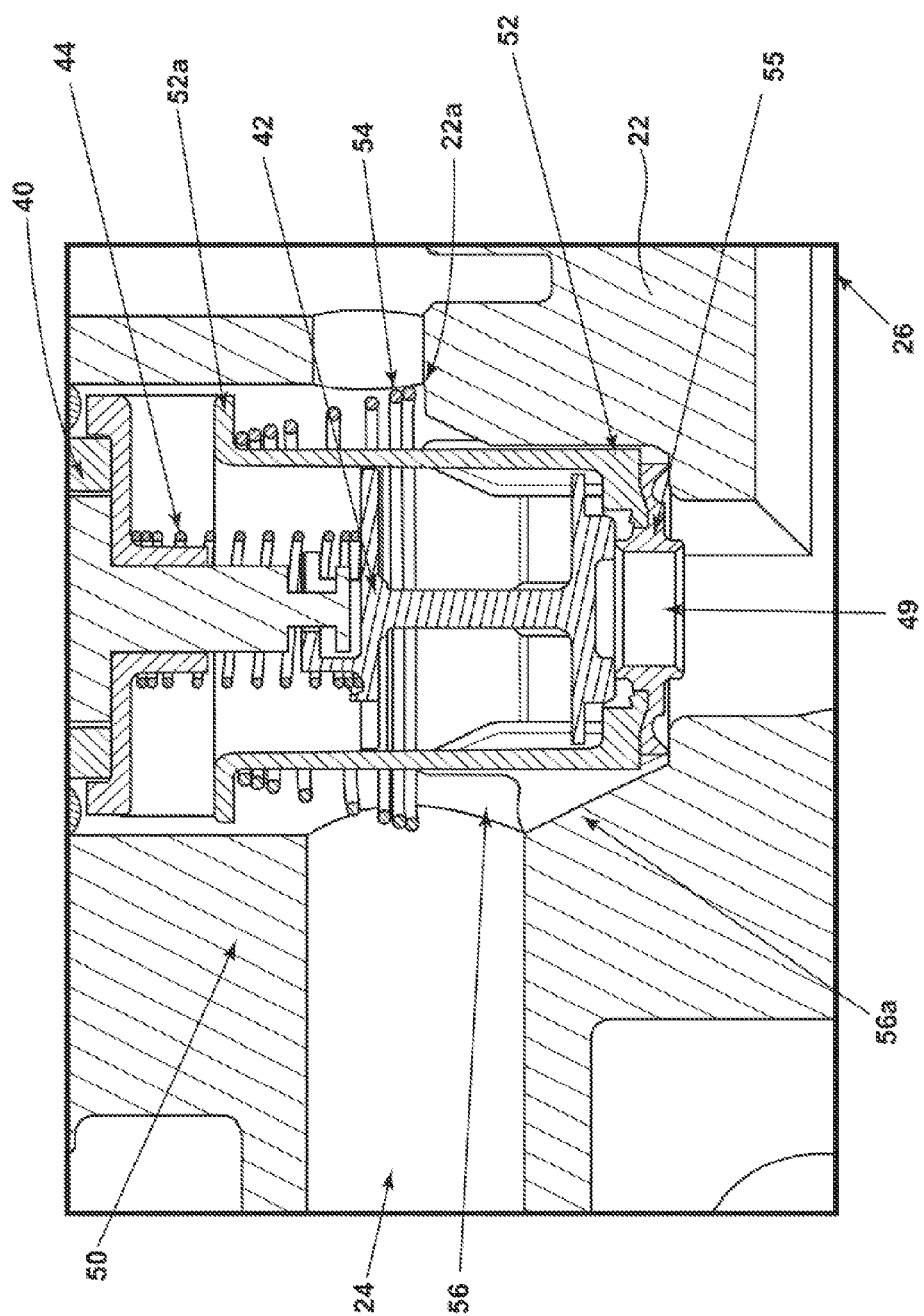
FIG. 5A is a cross-sectional view of a valve assembly according to another example of the present teachings.

In a further example of the present teachings, such as generally illustrated in FIG. 5A, passage 56 may include a sloped section 56a, but may include non-sloped sections (e.g., may not be entirely funnel-shaped). A passage 56 with a sloped portion 56a may function in a similar manner as a funnel-shaped passage. For example, and without limitation, sloped portion 56a may gradually increase the width and/or circumference of passage 56, which may allow for gradual opening and closing of flow restrictor 50, and/or faster depressurization.

Figure 5B:
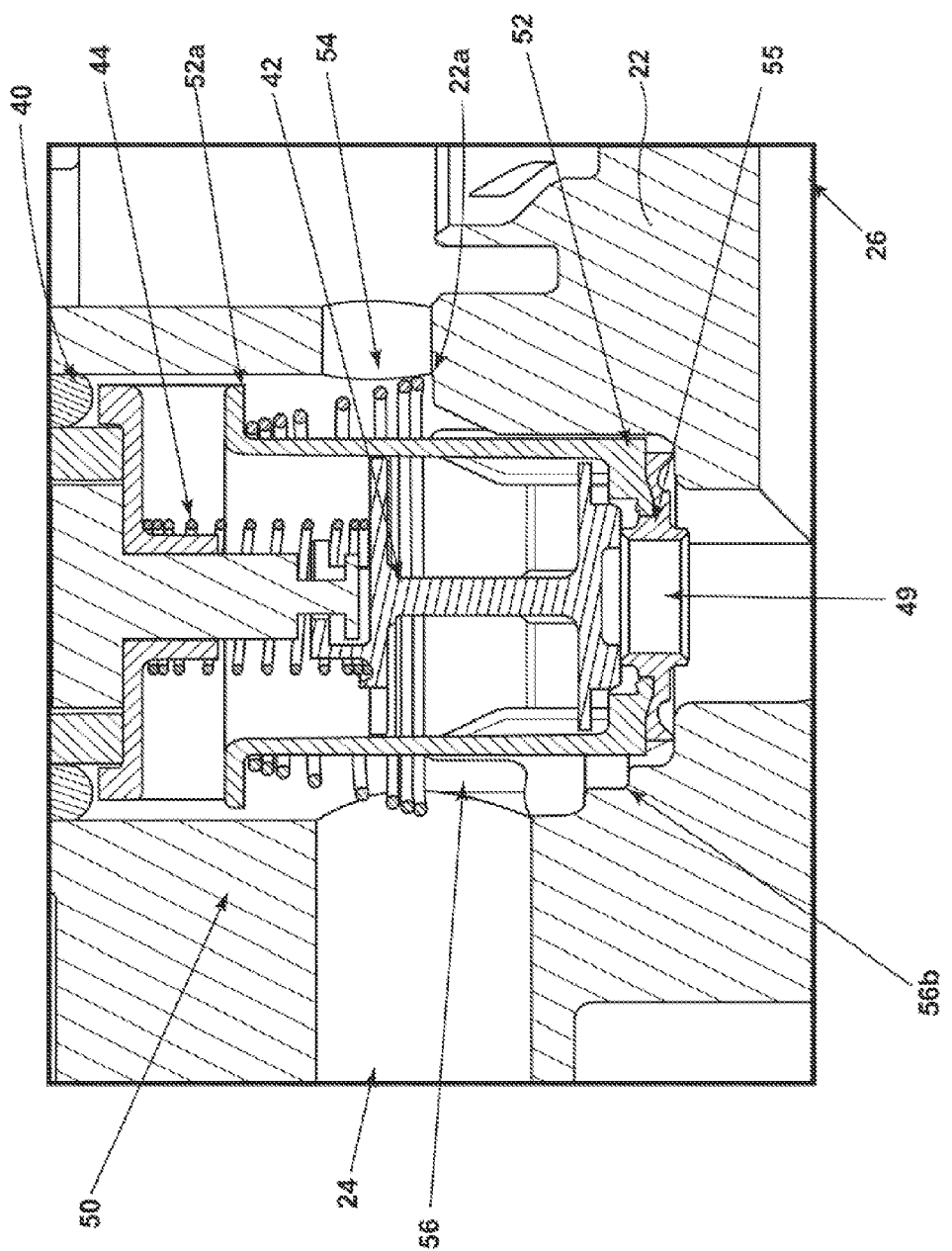
FIG. 5B is a cross-sectional view of a valve assembly according to another example of the present teachings.

In a further example of the present teachings, such as generally illustrated in FIG. 5B, passage 56 may include a stepped portion 56b. Stepped portion may include one or more steps (e.g., two, three, four, or more steps) that may gradually increase the width and/or circumference of passage 56.

In examples of the present teachings, such as generally illustrated in FIGS. 5A and 5B, piston 52 of flow restrictor 50 may include an elongated, hollow body with a generally cylindrical shape that may include a flow path between orifice 49 and passage 56. Seal 55 may be disposed generally between housing 22 and piston 52 and/or may define a minimum diameter of the small orifice 49. The flow restrictor spring 54 may be disposed around the outside of piston 52 and may engage a flange 52a of piston 52. The flange 52a may extend radially outward from the body of piston 52 and/or may extend around all or part of the circumference of piston 52. The flow restrictor spring 54 may also engage a recess 22a of body 22 that may be disposed, for example, about half between the top and bottom of piston 52 when piston 52 is in the closed position.

In the closed position, armature 42 may be biased by solenoid spring 44 to contact piston 52 and/or seal 55 to keep small orifice 49 closed. If solenoid assembly 40 is sufficiently energized or activated, such as in response to a signal from controller 14, armature 42 may be lifted off of seal 55 to expose small orifice 49. Small orifice 49 may start allowing a balancing of pressure and/or depressurization, and spring 54 may start moving piston 52 toward an open position at a predetermined pressure difference. Spring 54 may be a helical spring. As depressurization continues, piston 52 may move in passage 56 such that the gap between piston 52 and passage 56 increases via the sloped portion 56a and/or the stepped portion 56b. As the gap increases, a greater vapor flow rate may be permitted, which may allow for faster depressurization.

In other words, the shape of the passage 56 itself, in combination with the piston 52 diameter, may naturally create a passage 56 with a variable size to control vapor flow. Thus, the combination of the funnel-shaped, sloped, and/or stepped passage 56 and the selected biasing force of the restrictor spring 54 against the piston 52 may gradually adjust the amount of vapor released from the fuel tank 12 while adjusting the vapor flow rate via the position of the flow restrictor 50 in the passage 56 to prevent corking of fuel vent valves in the emissions system.

In an example of the present teachings, the weight of one or more components of flow restrictor 50, such as piston 52, may be configured such that one or more of the solenoid spring 44 and the flow restrictor spring 54 may be omitted (e.g., portions of valve assembly 20 may be controlled via gravity).

The foregoing descriptions of specific examples of the present teachings have been presented for purposes of illustration and description. They are not intended to be exhaustive or to limit the teachings to the precise forms disclosed, and various modifications and variations are possible in light of the above teaching. It is believed that various alterations and modifications of the exemplary aspects of the present teachings may become apparent to those skilled in the art from a reading and understanding of the specification. It is intended that all such alterations and modifications are included in the present disclosure, insofar as they come within the scope of the present teachings as defined by the claims appended hereto and their equivalents.

What is claimed is:

1. An isolation valve, comprising:
   a flow restrictor disposed in a passage having non-parallel sides, the flow restrictor having an orifice;
   a flow restrictor spring that applies a biasing force on the flow restrictor to bias the flow restrictor to an open position; and
   a solenoid assembly, including:
      a coil; and
      an armature that is moveable between (i) an extended position that overcomes the biasing force of the restrictor spring to move the flow restrictor to a closed position and to close the second orifice, and (ii) a retracted position to open the orifice,
   wherein when the coil is energized, the armature moves to the retracted position to allow vapor to flow through the orifice at least until the biasing force of the flow restrictor spring overcomes a vapor pressure; and, the open position of the flow restrictor allows vapor to flow through a space between the flow restrictor and the passage; wherein a first side of the non-parallel sides includes a step.

2. The isolation valve of claim 1, wherein a first side of the non-parallel sides is tapered.

3. The isolation valve of claim 2, wherein a second side of the non-parallel sides is tapered.

4. The isolation valve of claim 1, wherein the flow restrictor includes a piston movable between (i) an open position in which the flow restrictor allows vapor flow in a space between the flow restrictor and the passage, and (ii) a closed position in which the flow restrictor prevents vapor flow between the flow restrictor and the passage.

5. The isolation valve of claim 4, wherein the piston includes a cylindrically-shaped body with a radially extending flange.

6. The isolation valve of claim 4, wherein the flow restrictor includes a compliant seal disposed between the passage and the piston; and, the compliant seal defines a minimum diameter of the orifice.

7. The isolation valve of claim 1, further comprising an isolation valve body having a recess, wherein the flow restrictor spring engages a radially extending flange and the recess to bias a piston toward the open position.

8. An isolation valve, comprising:
   a flow restrictor disposed in a passage having non-parallel sides, the flow restrictor having an orifice;
   a flow restrictor spring that applies a biasing force on the flow restrictor to bias the flow restrictor to an open position; and
   a solenoid assembly, including:
      a coil; and
      an armature that is moveable between (i) an extended position that overcomes the biasing force of the restrictor spring to move the flow restrictor to a closed position and to close the second orifice, and (ii) a retracted position to open the orifice,
   wherein when the coil is energized, the armature moves to the retracted position to allow vapor to flow through the orifice at least until the biasing force of the flow restrictor spring overcomes a vapor pressure; and, the open position of the flow restrictor allows vapor to flow through a space between the flow restrictor and the passage; wherein a first side of the non-parallel sides includes a plurality of steps.

9. The isolation valve of claim 8, wherein the flow restrictor includes a piston movable between (i) an open position in which the flow restrictor allows vapor flow in a space between the flow restrictor and the passage, and (ii) a closed position in which the flow restrictor prevents vapor flow between the flow restrictor and the passage.

10. The isolation valve of claim 9, wherein the flow restrictor includes a compliant seal disposed between the passage and the piston; and, the compliant seal defines a minimum diameter of the orifice.

11. The isolation valve of claim 9, wherein the piston includes a cylindrically-shaped body with a radially extending flange.

12. The isolation valve of claim 8, further comprising an isolation valve body having a recess, wherein the flow restrictor spring engages a radially extending flange and the recess to bias a piston toward the open position.

13. The isolation valve of claim 8, wherein a first side of the non-parallel sides is tapered.

14. The isolation valve of claim 13, wherein a second side of the non-parallel sides is tapered.

15. An isolation valve, comprising:
   a body including a passage having non-parallel sides;
   a flow restrictor disposed in the passage, the flow restrictor including:
      an orifice;
      an open position in which the flow restrictor allows vapor flow in a space between the flow restrictor and the passage; and
      a closed position in which the flow restrictor prevents vapor flow between the flow restrictor and the passage; and
   an armature movable between (i) an extended position in which the armature prevents vapor flow through the orifice, and (ii) a retracted position, in which the armature allows vapor flow through the orifice; wherein the non-parallel sides include a stepped side having at least two steps.

16. The isolation valve of claim 15, further comprising:
   a flow restrictor spring that applies a biasing force on the flow restrictor to bias the flow restrictor toward the open position; and
   a solenoid valve assembly including a coil, a solenoid spring, and the armature.

17. The isolation valve of claim 16, wherein the armature is configured to move to the extended position via a biasing force provided by at least one of the solenoid spring and a vapor pressure; and, movement of the armature to the extended position causes the flow restrictor to move toward the closed position and closes the orifice.

18. The isolation valve of claim 17, wherein when the coil is energized, the armature moves to the retracted position to allow vapor to flow through the orifice at least until the biasing force of the flow restrictor spring overcomes the vapor pressure.

19. The isolation valve of claim 15, wherein the non-parallel sides include a sloped side.

20. The isolation valve of claim 15, wherein the non-parallel sides include a funnel shape.

21. A method of operating an isolation valve, the method comprising:
  providing an isolation valve body including a passage having non-parallel sides;
  providing an flow restrictor in the passage, the flow restrictor including:
    an orifice; and
    a piston movable between (i) an open position in which the flow restrictor allows vapor flow in a space between the flow restrictor and the passage, and (ii) a closed position in which the flow restrictor prevents vapor flow between the flow restrictor and the passage; and
  providing an armature movable between (i) an extended position in which the armature prevents vapor flow through the orifice, and (ii) a retracted position, in which the armature allows vapor flow through the orifice;
  moving the armature to the retracted position to allow vapor to flow through the orifice;
  reducing a vapor pressure via vapor flowing through the orifice; and
  moving the piston gradually from the closed position toward the open position; wherein the configuration of the non-parallel sides includes the passage including at least three steps.

22. The method of claim 21, wherein the gradual moving of the piston is accomplished according to a configuration of the non-parallel sides.

23. The method of claim 22, wherein the configuration of the non-parallel sides includes one or more of (i) the passage being funnel-shaped, (ii) the passage including a sloped side, (iii) the passage including a stepped side.

* * * * *